US008485876B2

(12) United States Patent
Bowerman

(10) Patent No.: US 8,485,876 B2
(45) Date of Patent: Jul. 16, 2013

(54) MONITORING A SPORTS DRAFT BASED ON A NEED OF A SPORTS TEAM AND THE BEST AVAILABLE PLAYER TO MEET THAT NEED

(76) Inventor: Maurice S. Bowerman, East Chatham, NY (US)

( * ) Notice: Subject to any disclaimer, the term of this patent is extended or adjusted under 35 U.S.C. 154(b) by 1348 days.

(21) Appl. No.: 11/363,474

(22) Filed: Feb. 27, 2006

(65) Prior Publication Data

US 2007/0203591 A1 Aug. 30, 2007

(51) Int. Cl.
*A63F 9/00* (2006.01)
*G06F 15/44* (2006.01)

(52) U.S. Cl.
USPC .................................. 463/4; 463/41; 463/42

(58) Field of Classification Search
USPC ................................................ 463/4; 700/90
See application file for complete search history.

(56) References Cited

U.S. PATENT DOCUMENTS

| | | | |
|---|---|---|---|
| 4,918,603 A * | 4/1990 | Hughes et al. | .................... 463/4 |
| 5,163,687 A | 11/1992 | Jenkins | |
| 5,263,723 A | 11/1993 | Pearson et al. | |
| 5,971,854 A * | 10/1999 | Pearson et al. | .................. 463/41 |
| 6,240,415 B1 | 5/2001 | Blumberg | |
| 6,371,855 B1 * | 4/2002 | Gavriloff | ........................ 463/42 |
| 6,877,010 B2 | 4/2005 | Smith-Semedo et al. | |
| 2001/0034734 A1 | 10/2001 | Whitley et al. | |
| 2003/0054885 A1 | 3/2003 | Pinto et al. | |
| 2003/0110480 A1 | 6/2003 | Rajaram | |
| 2004/0266530 A1 | 12/2004 | Bishop | |
| 2004/0266535 A1 | 12/2004 | Reeves | |
| 2005/0021352 A1 | 1/2005 | Maierhofer et al. | |
| 2005/0064937 A1 | 3/2005 | Ballman | |
| 2005/0138083 A1 | 6/2005 | Smith-Semedo et al. | |
| 2005/0159220 A1 | 7/2005 | Wilson et al. | |
| 2005/0164792 A1 * | 7/2005 | Wilcock | .......................... 463/42 |
| 2006/0252476 A1 * | 11/2006 | Bahou | ............................... 463/4 |
| 2007/0022029 A1 * | 1/2007 | Ma et al. | ......................... 705/35 |

OTHER PUBLICATIONS

"Fantasy Football League Rules at FFLeague", FFLeague.com. As archived by archive.org on Dec. 4, 2003. Accessed on Mar. 31, 2008. http://web.archive.org/web/20031204235435/http://www.ffleague.com/rules.htm.*
"Free Custom Fantasy Football Cheetsheats at FFToolbox.com", FFToolbox.com. As archived by archive.org on Sep. 24, 2005. Accessed on Mar. 31, 2008. http://web.archive.org/web/20050924182921/fftoolbox.com/2005/customcheatsheets.cfm.*

* cited by examiner

*Primary Examiner* — Paul A D'Agostino
(74) *Attorney, Agent, or Firm* — Heslin Rothenberg Farley & Mesiti P.C.; Victor A. Cardona, Esq.

(57) ABSTRACT

A capability for monitoring the progress of a sports draft is provided that automatically determines, during the sports draft, the best available player(s) for the personnel needs of a sports team having a current selection in the draft. The capability may automatically update the draft order to take into account any trades that occur during the sports draft.

24 Claims, 10 Drawing Sheets

Team Order

| Team | Pick |
|------|------|
| A | First |
| B | Second |
| C | Third |
| D | Fourth |
| E | Fifth |
| A | Sixth |
| B | Seventh |

| Team A's Needs ||
|---|---|
| 1. | Running Back |
| 2. | Linebacker |
| 3. | Offensive Guard |

FIG. 6

| Best Players Available by Position for Team A | | |
|---|---|---|
| Position | # | Player |
| Running Backs: | 1. | Jim Smith |
| | 2. | John Robinson |
| | 3. | Todd Williams |
| Linebackers: | 1. | Rod Wilson |
| | 2. | Reggie Lewis |
| | 3. | Scott Pawley |
| Offensive Guards: | 1. | Paul Hughes |
| | 2. | John Rankel |
| | 3. | George Stone |

FIG. 7

| Team B's Needs ||
|---|---|
| 1. | Running Back |
| 2. | Defensive End |
| 3. | Tight End |

FIG. 8

| Best Players Available by Position for Team B | | |
|---|---|---|
| Position | # | Player |
| Running Backs: | 1. | Jim Smith |
| | 2. | Todd Williams |
| | 3. | Larry Hand |
| | | |
| Defensive Ends: | 1. | Scott Trump |
| | 2. | Mark Shickel |
| | 3. | Todd Piston |
| | | |
| Tight Ends: | 1. | Len Zwick |
| | 2. | Ron Thomas |
| | 3. | Thomas Young |

FIG. 9

MONITORING A SPORTS DRAFT BASED ON A NEED OF A SPORTS TEAM AND THE BEST AVAILABLE PLAYER TO MEET THAT NEED

BACKGROUND OF THE INVENTION

1. Technical Field

The invention relates to a sports draft. In particular, the invention is concerned with monitoring and predicting a sports draft during the actual draft based on a sport team's personnel needs and the best available player to meet those needs.

2. Background Information

Draft day for a professional sport is not only intense and stressful for the athletes hoping to be drafted and the sport teams hoping to select quality players, but also for the casual fan. Many casual fans like to speculate and predict the order of players selected by the sports teams by pretending to be the general managers for each team and during the allotted time for the team, make its selection during the draft.

The draft for the major professional sports, such as football, basketball, hockey and baseball, is usually televised with commentary from certain analysts and interviews of players selected. However, the commentary during the draft is based on the player chosen with the previous selection in the draft and not focused on the next selection.

Prior to the draft, numerous publications and websites attempt to predict the order in which players will be selected during the draft. For example, many publications will create a "mock draft" including their prediction on which player will be selected by which team. Other publications or websites will rank each player by position and analyze each team's needs. The rankings and analysis is one source's opinion on which college, foreign or high school player will be selected by each sports team based on personnel needs of that team. However, these publications and websites are distributed or made available a couple of weeks before the draft and, therefore, are not updated to take into account, for example, any trades, free agency signings, serious injuries to players, or poor pre-draft workouts occurring subsequent to publication. Once the draft begins, the publications and websites are not up to date regarding actual draft picks, transactions and events occurring during the draft such as, for example, trades. Therefore, these publications and websites become obsolete shortly after the start of the draft.

During the draft, the casual fan is at the mercy of numerous outdated publications and websites to keep track of the players still available in the draft. With only limited time between draft picks, fans are forced to frantically switch back and forth between numerous publications and websites crossing out players that are selected and crossing out team needs based on the players selected.

Thus, a need exists for a capability to provide real time analysis and information relating a sports draft that enables the casual fan to monitor the progress of the draft without having to frantically flip between numerous publications and websites. There is also a need for providing automatic predictions for the sports team having the current selection during the sports draft that takes into account trades occurring during the draft and that shows personnel needs and the best players still available to meet those needs.

SUMMARY OF THE INVENTION

The shortcomings of the prior art are alleviated by using the capability of one or more aspects of the present invention. In accordance with one or more aspects of the present invention, the casual fan is provided the capability of monitoring the progress of a sports draft without the need to rely on outdated publications and websites to predict the next player selection in the draft.

In one aspect of the invention, there is a method of monitoring progress in a sports draft. The method includes, for instance, determining a team with a next selection in the sports draft and automatically determining, during the sports draft, a best available player for a position on the team with the next selection in the sports draft based on personnel needs of the team. In one embodiment, the best available player is determined based on a survey of a variety of sources.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, features and advantages of the invention are apparent from the following detailed description taken in conjunction with the accompanying drawings in which:

FIG. 6 depicts an example of one team's needs as a result of step 208 of the logic depicted in FIG. 2, in accordance with an aspect of the present invention;

FIG. 7 depicts an example of the best players available to fill the team's needs depicted in FIG. 6 as a result of step 210 of the logic depicted in FIG. 2, in accordance with an aspect of the present invention;

FIG. 8 depicts an example of another team's needs as a result of step 208 of the logic depicted in FIG. 2, in accordance with an aspect of the present invention; and FIG. 9 depicts an example of the best players available to fill the team's needs depicted in FIG. 8 as a result of step 210 of the logic depicted in FIG. 2, in accordance with an aspect of the present invention;

BEST MODE FOR CARRYING OUT THE INVENTION

In one aspect of the present invention, a capability is provided for facilitating the monitoring of a sports draft by providing, at least, the best players available for the personnel needs of a sports team having the current selection in the draft. The capability of one or more aspects of the present invention changes the process by which a casual fan monitors the progress of a sports draft. Instead of being at the mercy of numerous outdated websites and publications, the casual fan is provided, in real time, the best player available to meet the personnel needs of the team having the current selection in the draft that takes into account, for example, trades and previous player selections earlier in the draft and avoids the need to cross out names and personnel needs in the various publications used in the past to monitor the progress of the draft.

The best player available is determined and provided automatically, in one embodiment, as the draft progresses. For example, logic is executed within a communications environment that enables the processing of information in real-time to automatically determine and provide at the very least the best player available for a personnel need of a sports team.

Figure 1A:
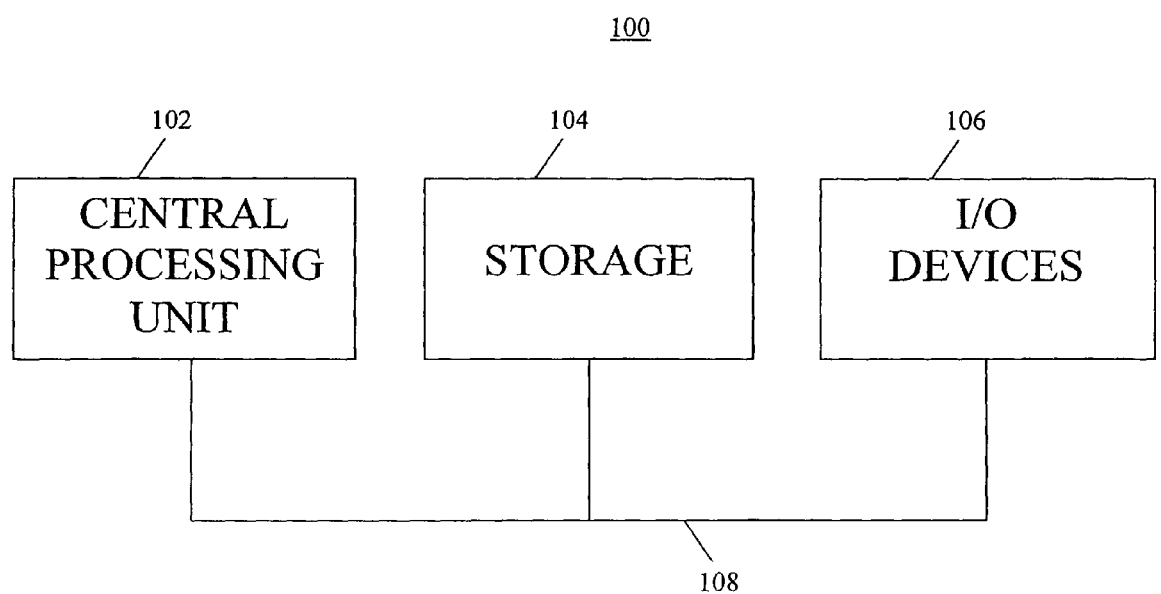
FIG. 1a depicts one embodiment of a communications environment incorporating and using one or more aspects of the present invention.

One embodiment of a communications environment to incorporate and use one or more aspects of the present invention is depicted in FIG. 1a. A communications environment 100 includes, for instance, a central processing unit 102, storage 104 and one or more input/output (I/O) devices 106 coupled via one or more buses 108. Pertinent information regarding the draft is stored in storage 104 and processed by logic executed by central processing unit 102. Further information may be input and/or results may be provided to a user (e.g., fan) via the input/output devices.

Although one example is depicted in FIG. 1a, there are many other types of environments to incorporate and/or use one or more aspects of the present invention. Another such environment is depicted in FIG. 1b.

Figure 1B:
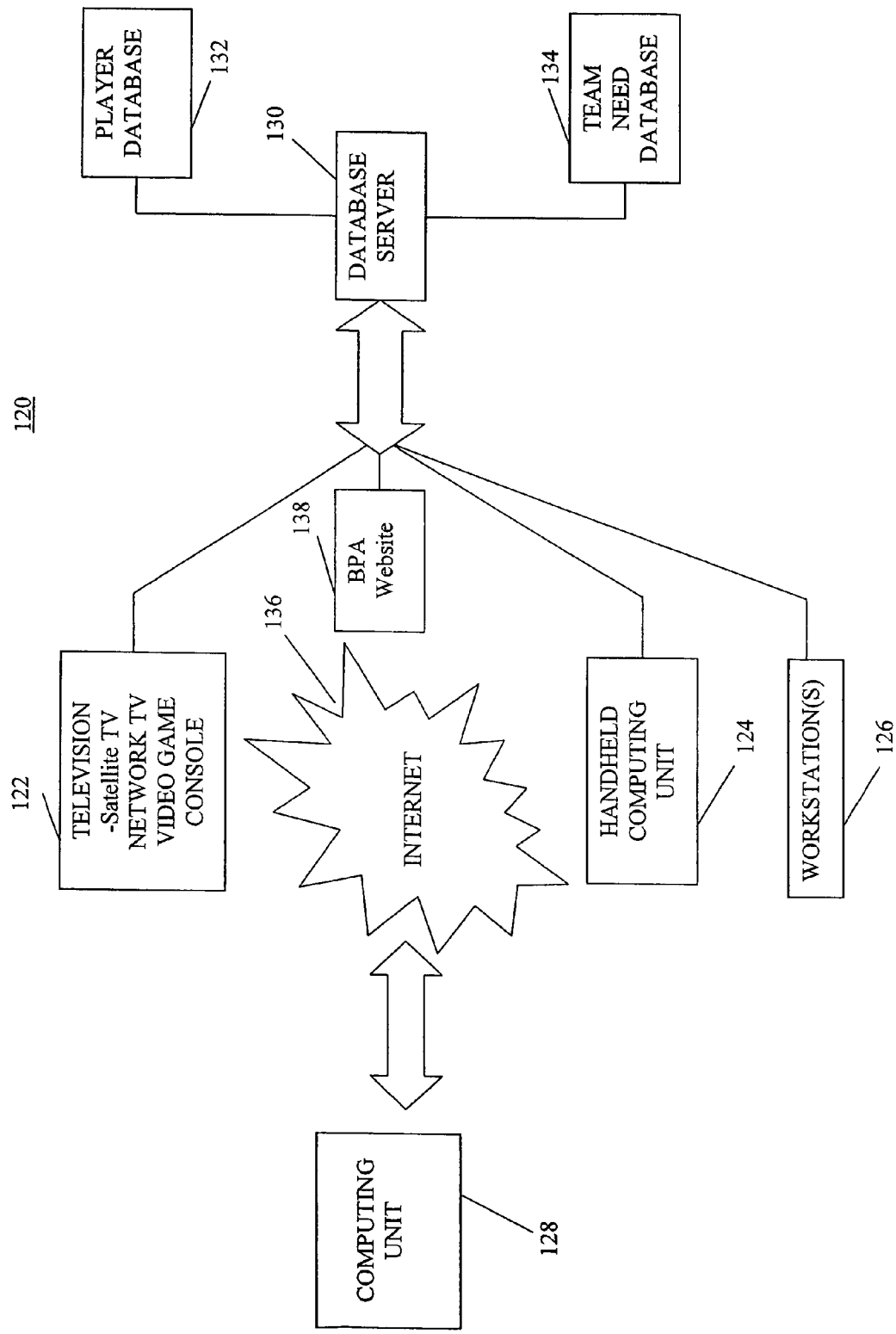
FIG. 1b is a schematic depiction of another example of a communications environment used in monitoring a sports draft in accordance with one or more aspects of the present invention.

Referring to FIG. 1b, in one embodiment, an environment 120 includes a plurality of different components 122-128 that have access to a database server 130 that is capable of accessing a plurality of databases 132, 134 to satisfy queries and provide updated information to one or more users (e.g., casual fan(s)) of the environment.

A number of different components are included in FIG. 1b and described below to demonstrate that users can access the capability of the present invention in a variety of ways. These are only examples, however. An environment may have more, less, or different components than those described herein and still benefit from one or more aspects of the present invention. Each of the components of FIG. 1b is described in further detail below.

As examples, components 122-126 include a television (e.g., satellite TV, network TV) and/or a video game console 122; a handheld computing unit 124, such as, for example, a cell phone, PDA, laptop, iPod, MP3 player, and the like; and one or more workstations 126, each of which is coupled to databases server 130. Each of components 122-126 is capable of interacting with the database server, including, but not limited to, requesting information from the server, receiving information and displaying information, among other tasks.

Components 122-126 may access the server directly or through an internet connection, as examples. Further, the internet connection and/or direct connection may be a wire connection, a wireless connection, or any other type of connection. Moreover, a user may be at a computing unit 128, such as a personal computer or laptop computer, as examples, and access database server 130 via internet 136 or other global or local communications network and one or more websites 138. In particular, the user accesses a best player available (BPA) website 138 via the internet and interacts with the database server through that website, which is coupled to the server. The server accesses the databases coupled thereto and provides the information to the website, which is accessible by computing unit 128.

In one example, Internet 136 includes a vast number of computers and computer networks that are interconnected through communication links. The interconnected computers exchange information using various services, such as electronic mail, and the World Wide Web ("WWW"). The WWW service allows a server computer system (i.e., Web server or Web site) to send graphical Web pages or information to a remote client computer system. The remote client computer system can then display the Web pages. Each resource (e.g., computer or Web page) of the WWW is uniquely identifiable by a Uniform Resource Locator ("URL"). To view a specific Web page, for example, computing unit 128 specifies the URL for that Web page in a request (e.g., a Hyper Text Transfer Protocol ("HTTP") request). The request is forwarded to the Web server that supports that Web page. When that Web server receives the request, it sends that Web page to the computing unit. When the computing unit receives that Web page, it typically displays the Web page using a browser. A browser is a special-purpose application program that effects the requesting of Web pages and the displaying of Web pages. Typically, browsers include, for example, Microsoft INTERNET EXPLORER or Netscape NAVIGATOR.

Internet 136 is coupled to computing unit 128 and/or database server 130 via one or more connections, such as a wire connection, wireless connection, or any other type of connection.

Database server 130 is capable of processing database queries received from one or more components of the environment. It includes, for instance, the logic to determine the best player available for a particular team, as described herein. It has access to one or more databases. In this example, database server 130 has access to a player database 132 and a team need database 134, which are stored in memory accessible to the server.

Collectively, databases 132, 134 store information relating to, for example, the draft order, players available in the draft, and sports teams having selections in the draft. Information about the available players for the draft is maintained in player database 132 and may include, for instance, biographical and statistical information along with both tangible and intangible attributes associated with each player. The biographical information may include, for example, the player's name, address, birth date, birthplace, school, position and coach's name. The statistical information may include, for example, the player's position and statistics relevant to that position. For instance, with respect to a running back in football, the statistical information might include, for examples, rushing yards, receiving yards, touchdowns, and fumbles. The tangible attributes may include, for example, body composition, such as height, weight and body fat, and performance on physical tests of speed, strength and jumping ability. The intangible attributes may include, for example, indicia of intelligence, leadership, work ethic, and workout habits. In addition, player database 132 includes information relating to rankings of players available in the draft by position.

Information about the sports teams is stored in team need database 134 and may include, for example, current roster, depth charts, team statistical information, such as, for example, win-loss record, and the like. Further, it includes personnel needs of the sport teams.

In one embodiment, the player rankings and personnel needs of the sport teams are the result of a survey of a compilation of a variety of sources that offer an opinion on the best players available in the sports draft, personnel needs of the sport teams or a mock draft of players drafted by the teams. The variety of sources may include, for example, local or national publications (e.g., Sports Illustrated, ESPN the Magazine, The Sporting News) or commentary from amateur or professional athletes, announcers, draft experts (e.g., Mel Kiper, Jr. for the NFL draft, Peter Gammons for MLB, Dick Vitale for the NBA), active or retired collegiate or professional coaches, fans, and employees of sports-related organizations such as, for example, ESPN and Fox Sports. The variety of sources may also include internet web sites such as, for example, any web site that offers a mock draft, a ranking of players or opinions on personnel needs for a sports team. Further sources for the NFL draft may include, for example, publications such as Mel Kiper Jr.'s Draft Report, Pro Football Weekly Draft Preview and Ourlads Guide, and websites such as gbnreport.com, scout.com, draftdatabase.com and profootballtalk.com. In an alternative embodiment, the ranking of players and personnel needs may include the opinion or input from the viewer or user of the present invention. For example, a user may rearrange the player rankings prior to or during the draft based on the user's own knowledge or experience with the sport teams.

Information relating to registration information for members, such as, for example, fans, that subscribe to a service that offers the logic in accordance with one or more aspects of the present invention may also be stored in memory accessible to server 130. Registration information may include, for example, member name, contact information and billing information.

Figure 2:
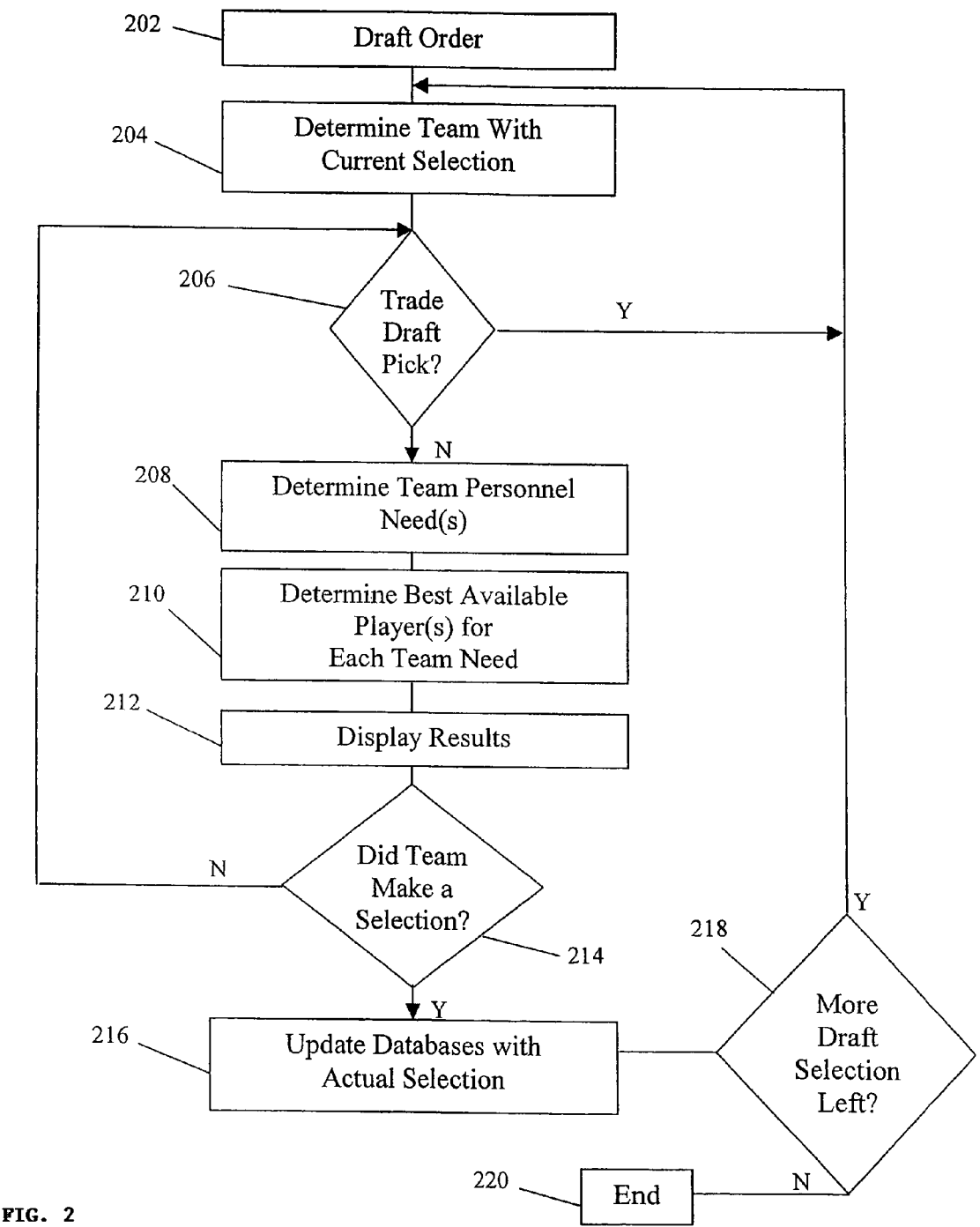
FIG. 2 is an overview of one embodiment of the logic associated with monitoring a sports draft according to one or more aspects of the present invention.
Figure 3:
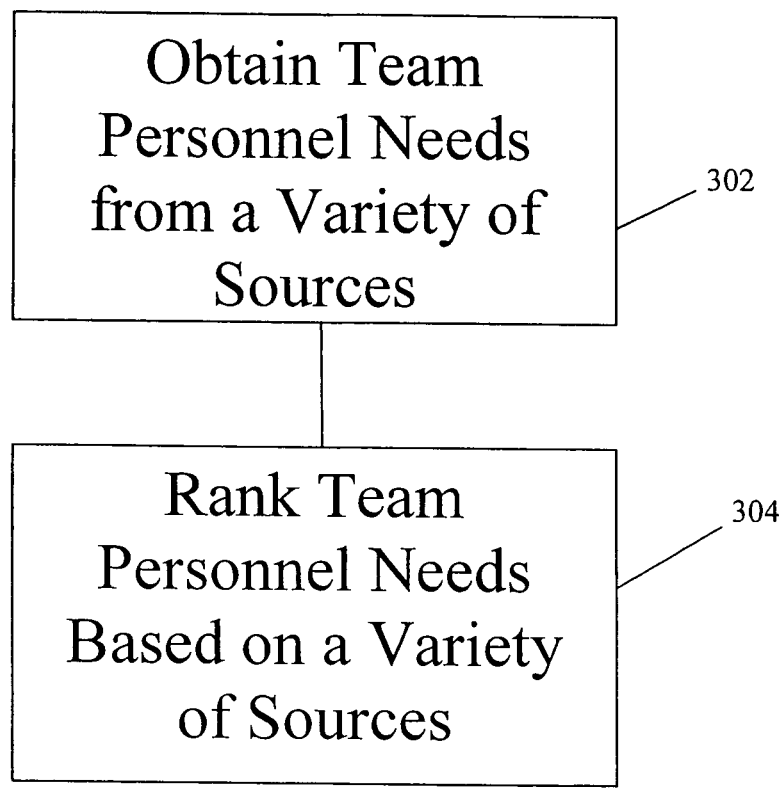
FIG. 3 shows an example of the steps involved in step 208 of the logic depicted in FIG. 2, in accordance with an aspect of the present invention.
Figure 4:
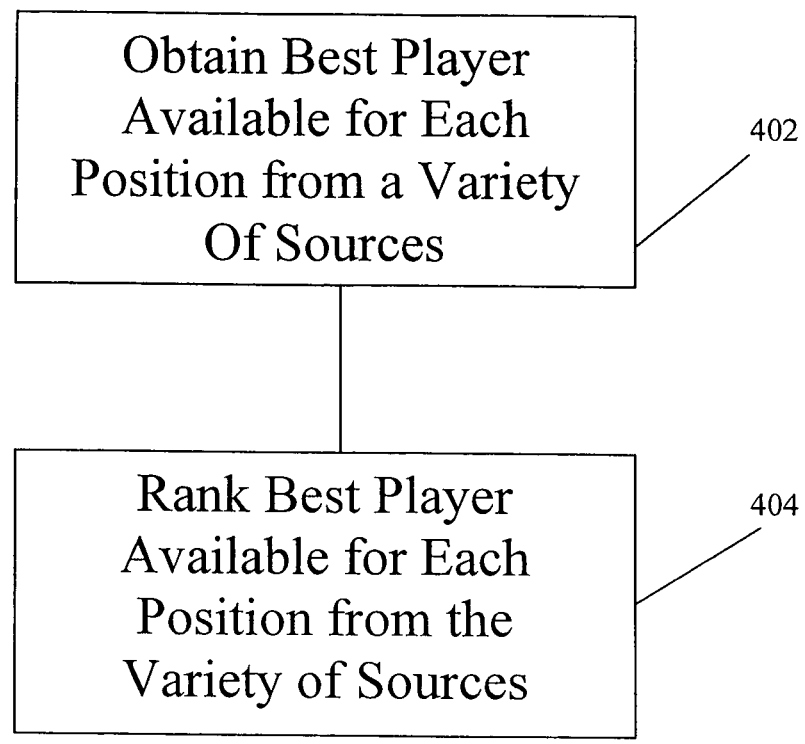
FIG. 4 shows an example of the steps involved in step 210 of the logic depicted in FIG. 2, in accordance with an aspect of the present invention.

In accordance with an aspect of the present invention, processed within the communications environment is logic to facilitate the monitoring of a sports draft in real time. The logic automatically updates, in one embodiment, the information (e.g., stored in the databases) used to make the decisions of the one or more best players available for a particular team, enabling real time monitoring and decision making. The logic is tailored to match the personnel needs of the sports team having the current selection with the best players available to meet those personnel needs during the sports draft, as shown in FIGS. 2-4. In particular, FIG. 2 is an overview of one embodiment of the general logic used to process the progression of the sports draft; FIG. 3 further provides an example of the steps involved in the logic step of 208, shown in FIG. 2; and FIG. 4 further provides an example of the steps involved in the logic step of 210, shown in FIG. 2.

FIG. 2 illustrates one embodiment of the logic used to monitor the progression of a sports draft based on the best players available and the personnel needs of the teams. For example, in step 202, the order of selection by the teams participating in the draft is obtained by having, receiving, requesting, generating or creating a draft order corresponding to the actual draft order set by the professional sports league, which includes the capability of adjusting the draft order by any trades involving draft picks that occur during the actual draft. For example, the actual draft order for the National Football League is determined by the win-loss record of each team during the previous season, any tiebreakers required, and trades involving draft positions prior to or during the actual draft. The draft order for other professional sports leagues, such as the National Basketball Association, use a lottery system to determine certain draft positions, along with any trades involving draft positions that occur prior to or during the actual draft.

In step 204, the team having the current selection in the sports draft is determined based on the draft order stored in memory. For example, if the team having the fifth selection in the draft just made its selection, then the team having the sixth selection in the draft would be determined to have the current selection in the draft. Once the team having the current selection is determined, the logic determines, in inquiry 206, if that team traded its selection to another team. In one instance, a trade is determined by comparing the current draft order stored in memory with the actual draft order in real time. The actual draft order is obtained by having, receiving, requesting, generating or creating a new draft order that takes into account any trades made by the team having the current selection in the draft. In one embodiment, the new draft order is obtained by, for example, the user or viewer watching the draft on television or following the draft selections over the Internet. If it is determined in step 206 that the team having the current selection trades the current selection to another team, then the new draft order is obtained and the logic proceeds again to step 204.

If there is no trade in inquiry 206, the logic proceeds to determine the personnel needs of the team having the current selection in the draft, step 208. FIG. 3 depicts further details of an example of logic for step 208 wherein the personnel needs of the team having the current selection in the draft is determined. In one example, the personnel needs of the team having the current selection in the draft is obtained, in step 302. In one embodiment, the personnel needs of the team are obtained from database 134. Database 134 is populated with the information obtained by having, receiving, requesting, generating or creating a list of needs for one or more positions on the team from a survey of a variety of sources. For example, with respect to the NFL draft, the personnel needs for any NFL team may be obtained from publications, such as, for example, Mel Kiper Jr.'s Draft Report, Pro Football Weekly Draft Preview and Ourlads Guide, and websites such as gbnreport.com, scout.com, draftdatabase.com and profootballtalk.com. Once the personnel needs of the team are obtained in step 302, the personnel team needs are ranked, in step 304, based on, for example, another survey of the variety of sources. For example, if a majority of sources surveyed consider quarterback to be the most needed positional need for the Pittsburgh Steelers in the NFL to focus on in the draft, then step 304 would rank quarterback as the number one need for this team during its draft selection. Alternatively, the personnel needs for any NFL team and the ranking of these personnel needs may be, for example, generated using statistics. In one embodiment, step 304 would rank every position in order for each team having the current selection in the draft. Of course, if the Pittsburgh Steelers selected a quarterback during one of its previous draft selections, then the logic would not rank this personnel need as high by, for example, putting this personnel need at the bottom of the rankings of personnel needs for that team during future selections.

Returning to FIG. 2, once the personnel need of the team having the current selection in the draft is determined in step 208, the best player(s) available in the draft are determined in step 210 for the personnel needs determined in step 208 for the team having the current selection. In an alternative embodiment, more than one personnel needs of the team having the current selection in the draft is determined in step 208 and the best player(s) available in the draft are determined in step 210 for each of these personnel needs. FIG. 4 depicts further details of an example of step 210 wherein the best players available for each personnel need of the team having the current selection in the draft is determined. In one example, the players available for each position on the team in the draft is obtained, in step 402. In one embodiment, the players available for each personnel need of the team having the current selection in the draft are obtained from database 132. Database 132 is populated with the information obtained by having, receiving, requesting, generating or creating a list of players available in the draft from, for example, a variety of sources. Once the list of available players in the draft is obtained in step 402, the players are ranked, in step 404, based on, for example, a survey of the variety of sources. Alternatively, the best players available and the ranking of these players may be, for example, generated using statistics. For example, if quarterback was determined to be the personnel need of the NFL team having the current selection in the NFL draft and if a majority of sources surveyed consider Robert Fiedler as the best quarterback in the draft in step 304, then step 404 would rank Robert Fiedler as the best available player for the quarterback position. In one embodiment, step 404 would rank every player available in order for each position corresponding to the personnel needs of the team having the current selection in the draft determined in step 304. In an alternative embodiment, the ranking of the available players for each position is preset before the draft and step 210 simply determines the best players available from this predetermined ranking.

Once the best players available for the personnel needs of the team having the current selection in the draft is determined, this information is displayed in step 212 (FIG. 2). In addition to the display, for example, of the name of the best players available, the biographical and statistical information of the best player available may also be displayed. Also, in addition to the personnel needs of the team having the current selection, the existing players on the team's roster for the positions corresponding to the personnel needs may also be displayed.

During a draft, each team having the current selection typically has a period of time in which to make its selection. For example, during the NFL draft, each team is allowed fifteen minutes during the first round to make a selection, ten minutes to make their second round selection and five minutes for later round selections. At any point during the allotted period of time to make a draft selection, the team having the current selection can select or draft a player or trade the current selection to another team in exchange for another draft pick, players, cash or a combination of the same. Therefore, in inquiry 214, a determination is made as to whether the team having the current selection made a draft selection. The actual selection made by the team is obtained by having, receiving, requesting, generating or creating the real time selection made in the actual draft. In one embodiment, the user or viewer may obtain the name of the player selected by the team having the current selection by watching the actual draft. In alternative embodiments, the player selected may be entered automatically from, for example, a computing unit in the communications environment depicted in FIG. 1 that is monitoring the draft order and player selection in the draft.

If the team having the current selection did not make a selection and there is still more time during the round in which this team may select a player, then the logic proceeds again to step 206 and continues to process steps 206 through 214 until the team having the current selection makes its selection, trades its draft pick or the time to make a selection runs out. During the NFL draft, for example, when the time runs out on the team having the current selection to make its selection, the next team having a selection may "jump" ahead and make its own selection. The previous team will continue to be "jumped over" until it makes its selection. Therefore, in one embodiment, the logic may continue to display the personnel needs and corresponding best players available for those needs for the teams having previous draft selections until those previous teams make an actual selection.

Once the team having the current selection makes its actual selection in the draft, databases 132, 134 are updated in step 216 by, for example, removing the selected player from the player database and eliminating or re-ranking the personnel needs of the team database. For example, when the team having the current selection selects a player, that player cannot be selected by another team later in the draft, and, therefore, is removed from the list of available players during step 216. Also, the personnel need of the team that is satisfied is removed or placed at the bottom of the personnel needs ranking for that team during future round selections for that team, assuming the team met that need with its current player selection. Therefore, during that team's next selection, which typically occurs in the next round, or which could occur earlier or later than the next round depending on trades, the personnel needs for that team would take into account its previous selection. Of course, if a team's personnel needs require more than one player at a particular position, such as for example, linebacker for an NFL team or guard for an NBA team, then step 216 would not remove the additional personnel need for that particular position or the rankings could include more than one personnel need for that particular position.

In one embodiment, the databases are updated automatically using logic (e.g., computer code) to effect the changes. In this embodiment, manual input of the information is not needed. In other embodiments, however, manual input may be used.

Once the player and team databases are updated based on the actual selection of a player by the team having the current selection, a determination is made as to whether there are more draft selections remaining in the draft, inquiry 218. If there are more draft selections left, then the logic will continuously repeat steps 204 through 218 by progressing down the draft order until the draft is over. Once there are no teams having any more draft selections left, the logic will end, step 220.

In the past, the casual fan, during a sports draft was required to frantically switch between a variety of sources published before the start of the draft to determine the best player available and personnel needs of the team having the current selection in the draft. In accordance with one or more aspects of the present invention, the need to rely on and shift through these outdated publications is avoided by providing the fan the capability of monitoring the progress of the draft in real time by automatically determining the personnel needs of the best player available to fit that need of the team having the current selection in the draft.

Figure 5:
FIG. 5 shows an example of a draft order used in step 202 of the logic depicted in FIG. 2, in accordance with an aspect of the present invention.
Figure 5:

One example of the capabilities of one or more aspects of the present invention is illustrated in FIGS. 5-9 with respect to the NFL draft. FIG. 5 illustrates one example of a draft order, which is obtained and set prior to the draft, but may be subject to change during the draft due to trades. As shown in FIG. 5, Team A has the first pick in the draft; Team B has the second pick in the draft, and so on. In this example, the order repeats itself after every five picks for seven rounds with, for example, Team A having the sixth overall pick or the first pick in the second round, Team B having the seventh overall pick or the second pick in the second round, and so on.

At the start of the draft, Team A would be determined to have the current selection in the draft, unless Team A trades the pick. If Team A trades the pick, then the team to which this pick was traded would be determined to have the current selection in the draft. Assuming Team A does not trade its pick, the personnel needs of Team A are determined and ranked, as shown in FIG. 6. For example, Team A's personnel needs are determined to be, in order, the positions of running back, linebacker and offensive guard. After the personnel needs of Team A are determined, the best available players for each of these positions are determined and ranked, as shown in FIG. 7. For example, the best players available for the running back position are determined to be, in order, Jim Smith, John Robinson and Todd Williams. After the personnel needs and best players available for these personnel needs are determined using, for instance, information stored in the databases, the results are displayed to the casual fan during the period of time the team having the current selection in the draft makes its selection. Once a selection is made, then the databases relating to the personnel needs of the team that just selected and the player selected are updated by, for example, removing the personnel need of that team from the top of the list and removing the player name from the list of available players in the draft. For example, if Team A selects running back John Robinson with its current selection, the personnel need of Team A for a running back would be removed from the top of the personnel ranking for that team and John Robinson would be removed as an available player in the draft for future teams to select.

After Team A makes its selection, Team B would be determined to be the team having the current selection in the draft based on the draft order. Assuming Team B does not trade its pick, the personnel needs of Team B are determined and ranked, as shown in FIG. 8. For example, Team B's personnel needs are determined to be, in order, the positions of running back, defensive end and tight end. After the personnel needs of Team B are determined, the best available players for each of these positions is determined and ranked, as shown in FIG. 9. For example, the best players available for the running back position are determined to be, in order, Jim Smith, Todd Williams, and Larry Hand. Since Team A selected John Robinson with the previous selection, John Robinson is not available at the running back position for Team B to draft. After the personnel needs and best players available for these personnel needs are determined for Team B, the results are displayed during the period of time the team having the current selection in the draft makes its selection. Once a selection is made by Team B, then the databases relating to the personnel needs of the team that just selected and the player selected are updated by, for example, removing the personnel need of that team from the top of the list and removing the player name from the list of available players in the draft.

If, for example, Team B trades its current selection to Team E for Team E's fifth pick in the first round, then Team E would automatically be considered the team having the current selection in the draft and the personnel needs of Team E and the best players available for those personnel needs would be displayed. Also, the draft order would be automatically adjusted to reflect the trade of draft picks between Team B and Team E, so that when the current selection in the draft is the fifth selection in the first round, Team B, not Team E, would be considered to have the current selection.

The capability of one or more aspects of the present invention to provide real time analysis and information relating a sports draft that enables the casual fan to monitor the progress of the draft without having to frantically flip between numerous outdated publications and websites. For example, the capability provides automatic predictions for the sports team having the current selection during the sports draft that takes into account trades occurring during the draft and that shows personnel needs and the best players still available to meet those needs.

Although examples are provided herein, these are only examples. Many variations may be made without departing from the spirit of the present invention. For example, instead of displaying three personnel needs of the team having the current selection, one or more, even all of the positions in order of need may be displayed. Also, instead of displaying three available players in order for the personnel needs of the team having the current selection, more or less than three or all of the players available in the draft for the personnel needs may be displayed. Further, the logic in accordance with the principles of the present invention may be used during a draft for any professional or amateur sports draft or during a sports draft in the various fantasy sports leagues.

Moreover, the above described computing environments and/or computing units are only offered as examples. The present invention can be incorporated and used with many types of computing units, computers, processors, nodes, systems, workstations and/or environments without departing from the spirit of the present invention. Additionally, in various aspects of the present invention, the client need not be remote from the server. Various aspects of the invention are equally applicable to clients and servers running on the same physical machine, different physical machines or any combinations thereof.

Also, although examples of connections are provided herein, a component of the environment may be coupled to another component via any type of connections(s). Further, the logic to determine the best player available and/or other logic described herein can be executed on a processing unit other than the database server described herein. For instance, it may be installed and/or executed on a user's local processing unit (e.g., personal computer, laptop, handheld device, etc.). Similar, the database may also be locally maintained. Many other variations exist.

The present invention can be included in an article of manufacture (e.g. one or more computer program products) having, for instance computer readable program codes means for providing and facilitating the capabilities of the present invention. The article of manufacture can be included as part of a computer system of sold separately.

For instance, a data processing system suitable for storing and/or executing program code is usable that includes at least one processor coupled directly or indirectly to memory elements through a system bus. The memory elements include, for instance, local memory employed during actual execution of the program code, bulk storage, and cache memories which provide temporary storage of at least some program code in order to reduce the number of times code must be retrieved from bulk storage during execution.

Input/output or I/O devices (including, but not limited to, keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the available types of network adapters.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk—read/write (CD-R/W) and DVD.

Additionally, at least one program storage device readable by a machine, tangibly embodying at least one program of instructions executable by the machine to perform the capabilities of the present invention can be provided.

The flow diagrams depicted herein are just exemplary. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

The invention claimed is:

1. A method of monitoring progress in a sports draft, the method comprising:
   automatically determining a team with a next selection in the sports draft by a computing unit;
   automatically determining at least one player available for the sports draft based on previous selections in the sports draft;
   automatically determining personnel needs of the team by playing position by the computing unit based on at least one of a previous selection by the team and a trade by the team;
   automatically obtaining by the computing unit a plurality of rankings of each player by playing position of the at least one player available for selection in the sports draft from a plurality of sources of rankings remote from the computing unit and coupled to the computing unit, the plurality of sources of the rankings being non-participants of the sports draft;
   comparing each ranking of the rankings for each player of the at least one player to each other ranking of the rankings to determine a positional ranking of players for each position to be selected in the sports draft;
   automatically determining by the computing unit in real time, during the sports draft, a best available player for a position on the team with the next selection in the sports draft based on the personnel needs of the team, the at least one player available for the sports draft and the positional ranking; and
   providing an indication of the best available player to a display by the computing unit.

2. The method of claim 1, wherein said automatically determining comprises automatically determining more than one best available player for a position on the team with the next selection in the sports draft.

3. The method of claim 1, wherein said automatically determining the best available player comprises automatically determining the best available player for more than one position on the team with the next selection in the sports draft based on personnel needs of the team.

4. The method of claim 3, wherein the personnel needs of the team with the next selection in the sports draft is obtained from a survey of a variety of sources.

5. The method of claim 3, wherein said automatically determining the best available player comprises automatically determining more than one best available player for the more than one position on the team with the next selection in the sports draft.

6. The method of claim 5, wherein said automatically determining the best available player comprises ranking the more than one best available player for the more than one position on the team.

7. The method of claim, wherein the draft order automatically updates in response to any trades involving draft selections occurring during the sports draft.

8. The method of claim 1, wherein the team with the next selection in the sports is automatically determined.

9. A computer system for monitoring progress in a sports draft, the system comprising:
   a memory;
   a processor in communications with the memory, wherein the computer system is configured to perform a method, said method comprising:
      automatically determining a team with a next selection in the sports draft by a computing unit;
      automatically determining at least one player available for the sports draft based on previous selections in the sports draft;
      automatically determining personnel needs of the team by playing position by the computing unit based on at least one of a previous selection by the team and a trade by the team;
      automatically obtaining by the computing unit a plurality of rankings of each player by playing position of the at least one player available for selection in the sports draft from a plurality of sources of rankings remote from the computing unit and coupled to the computing unit, the plurality of sources of the rankings being non-participants of the sports draft;
      comparing each ranking of the rankings for each player of the at least one player to each other ranking of the rankings to determine a positional ranking of players for each position to be selected in the sports draft;
      automatically determining by the computing unit in real time, during the sports draft, a best available player for a position on the team with the next selection in the sports draft based on the personnel needs of the team, the at least one player available for the sports draft and the positional ranking; and
      providing an indication of the best available player to a display by the computing unit.

10. A computer program product for monitoring the progress of a sports draft, the computer product comprising:
   a non-transitory computer readable storage medium readable by a processing circuit and storing instructions for execution by the processing circuit for performing a method comprising:
      automatically determining a team with a next selection in the sports draft by a computing unit;
      automatically determining at least one player available for the sports draft based on previous selections in the sports draft;
      automatically determining personnel needs of the team by playing position by the computing unit based on at least one of a previous selection by the team and a trade by the team;
      automatically obtaining by the computing unit a plurality of rankings of each player by playing position of the at least one player available for selection in the sports draft from a plurality of sources of rankings remote from the computing unit and coupled to the computing unit, the plurality of sources of the rankings being non-participants of the sports draft;
      comparing each ranking of the rankings for each player of the at least one player to each other ranking of the rankings to determine a positional ranking of players for each position to be selected in the sports draft;
      automatically determining by the computing unit in real time, during the sports draft, a best available player for a position on the team with the next selection in the sports draft based on the personnel needs of the team, the at least one player available for the sports draft and the positional ranking; and providing an indication of the best available player to a display by the computing unit.

11. The computer program product of claim 10, wherein said logic to automatically determine comprises obtaining the best player available from a survey of a variety of sources.

12. The computer program product of claim 10, wherein the personal needs of the team with the next selection in the sports draft is obtained from a survey of a variety of sources.

13. The computer program product of claim 10, wherein said automatically determining comprises automatically determining more than one best available player for more than one position on the team with the next selection in the sports drafts.

14. The method of claim 1, wherein the sports draft involves multiple teams selecting players in succession.

15. The method of claim 14, wherein the same player cannot be drafted by more than one team of the multiple teams.

16. The system of claim 9, wherein the sports draft involves multiple teams selecting players in succession.

17. The system of claim 9, wherein the same player cannot be drafted by more than one team of the multiple teams.

18. The computer program product of claim 10, wherein the sports draft involves multiple teams selecting players in succession.

19. The computer program product of claim 10, wherein the same player cannot be drafted by more than one team of the multiple teams.

20. The method of claim 1 wherein the automatically determining the best available player comprises substituting a new best available player for a previous best available player based on the personnel needs of the team, the at least one player available for the sports draft and the plurality of pieces of information.

21. The method of claim 1 further comprising:
ranking a plurality of players by a user input into the computing unit;
automatically determining by the computing unit in real time, during the sports draft, a user best available player for a position on the team with the next selection in the sports draft based on the personnel needs of the team, the at least one player available for the sports draft and the ranking by the user; and
providing an indication of the user best available player to a display by the computing unit.

22. The method of claim 1 further comprising the user ranking user personnel needs of the team and the automatically determining the user best available player comprises automatically determining based on the user personnel needs of the team, the at least one player available for the sports draft and the ranking by the user.

23. A method for performing a sports draft, the method comprising:
obtaining a plurality of rankings by playing position for a plurality of players for selection in the sports draft from a plurality of sources of rankings by playing position, the plurality of sources being non-participants of the sports draft;
comparing each ranking of the rankings for each player of the plurality of players to each other ranking of the rankings to determine a positional ranking of players for each position to be selected in the sports draft;
automatically determining a team with a next selection in the sports draft by a computing unit;
automatically determining by the computing unit at least one player available from the plurality of players for the sports draft based on previous selections in the sports draft;
automatically determining personnel needs of the team by playing position by the computing unit based on at least one of a previous selection by the team and a trade by the team;
automatically determining by the computing unit in real time, during the sports draft, a best available player for a position on the team with the next selection in the sports draft based on the personnel needs of the team, the at least one player available for the sports draft and the positional ranking; and
providing an indication of the best available player to a display by the computing unit.

24. The method of claim 1 further comprising a user determining a user positional ranking based on the positional ranking and a user's own knowledge after the positional ranking is determined and before the automatically determining of the best available player.

* * * * *

UNITED STATES PATENT AND TRADEMARK OFFICE
CERTIFICATE OF CORRECTION

PATENT NO. : 8,485,876 B2
APPLICATION NO. : 11/363474
DATED : July 16, 2013
INVENTOR(S) : Maurice S. Bowerman Page 1 of 1

It is certified that error appears in the above-identified patent and that said Letters Patent is hereby corrected as shown below:

In the Claims

Column 11, Line 65, insert --1-- after the word claim

Signed and Sealed this
Twenty-fourth Day of September, 2013

Teresa Stanek Rea
*Deputy Director of the United States Patent and Trademark Office*